(12) United States Patent
Lee

(10) Patent No.: US 12,119,473 B2
(45) Date of Patent: Oct. 15, 2024

(54) FOLDING TYPE LITHIUM AIR BATTERY AND METHOD FOR MANUFACTURING SAME

(71) Applicants: Hyundai Motor Company, Seoul (KR); Kia Motors Corporation, Seoul (KR)

(72) Inventor: Jae Seung Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 141 days.

(21) Appl. No.: 17/106,727

(22) Filed: Nov. 30, 2020

(65) Prior Publication Data

US 2021/0175565 A1    Jun. 10, 2021

(30) Foreign Application Priority Data

Dec. 6, 2019    (KR) .................. 10-2019-0161212

(51) Int. Cl.
*H01M 12/06*    (2006.01)
*H01M 4/36*    (2006.01)
*H01M 10/0565*    (2010.01)
*H01M 10/0567*    (2010.01)
*H01M 10/0569*    (2010.01)
*H01M 10/0583*    (2010.01)
*H01M 50/46*    (2021.01)

(52) U.S. Cl.
CPC .......... *H01M 12/06* (2013.01); *H01M 4/366* (2013.01); *H01M 10/0565* (2013.01); *H01M 10/0567* (2013.01); *H01M 10/0569* (2013.01); *H01M 10/0583* (2013.01); *H01M 50/46* (2021.01); *H01M 2300/0071* (2013.01)

(58) Field of Classification Search
CPC .......... H01M 10/0583; H01M 50/449; H01M 50/457; H01M 12/04; H01M 12/06; H01M 12/08

See application file for complete search history.

(56) References Cited

U.S. PATENT DOCUMENTS

| | | | |
|---|---|---|---|
| 2013/0224609 A1* | 8/2013 | Lee | H01M 12/08 429/492 |
| 2017/0222244 A1* | 8/2017 | Kim | H01M 10/0525 |
| 2020/0091550 A1* | 3/2020 | Choi | H01M 4/1395 |

FOREIGN PATENT DOCUMENTS

| | | | |
|---|---|---|---|
| JP | 2008300173 A | * | 12/2008 |
| KR | 2012126956 A | * | 11/2012 |
| KR | 10-1851564 B1 | | 4/2018 |

* cited by examiner

*Primary Examiner* — Stephan J Essex

(57) ABSTRACT

Disclosed herein are a folding type lithium air battery and a method for manufacturing the battery. The lithium air battery is configured such that a first electrolyte membrane and a second electrolyte membrane including reinforcing layers and ionic liquids that are suitable for a positive electrode and a negative electrode, respectively, are formed, and a separator including a diffusion prevention membrane is provided between the first electrolyte membrane and the second electrolyte membrane, thus guaranteeing the stability of an electrode, and improving battery performance due to excellent ionic conductivity.

12 Claims, 12 Drawing Sheets

A-A Section

A-A Section

B-B Section

FOLDING TYPE LITHIUM AIR BATTERY AND METHOD FOR MANUFACTURING SAME

CROSS REFERENCE TO RELATED APPLICATION

The present application claims priority to Korean Patent Application No. 10-2019-0161212, filed Dec. 6, 2019, the entire contents of which are incorporated herein for all purposes by this reference.

TECHNICAL FIELD

The present invention relates to a folding type lithium air battery and a method for manufacturing the battery. The folding type lithium air battery may prevent the deterioration of durability and the volatilization of an electrolyte thereby guaranteeing the stability of an electrode, and may have excellent ionic conductivity thereby improving battery performance.

BACKGROUND

A lithium air battery includes a positive electrode in which the reduction reaction of oxygen occurs, a negative electrode in which the oxidation reaction of lithium occurs, an electrolyte solution which transfers lithium ions and electrons, and a separator which separates the positive electrode from the negative electrode. Since the lithium air battery has a higher energy density and higher safety than a lithium ion battery, many development efforts of the lithium air battery are being undertaken.

Unlike the lithium ion battery, the lithium air battery requires a structure that supplies and discharges air into or from an electrode, and a structure that collects current by connecting several electrodes to each other so as to increase a battery capacity. The battery connecting several electrodes to each other is generally classified into a pouch type battery and a stack type battery. For example, the pouch type battery has been manufactured by making a positive-electrode oxygen inlet hole in a pouch. However, this is problematic in that the electrolyte leaks or volatilizes out of the hole, and compression molding is difficult due to the hole.

Furthermore, the stack type battery has a structure in which multiple positive electrodes and negative electrode unit cells are sequentially stacked. Such a stack type battery makes it easy to manufacture a prismatic battery, but is problematic in that a manufacturing process is complicated and an electrode is pushed when shocks are applied thereof, thus causing a short circuit.

Meanwhile, since the lithium air battery is operated in an open system, a non-volatile electrolyte is used to prevent the electrolyte from volatilizing. However, the non-volatile electrolyte is problematic in that it may be decomposed by a chemical reaction with a lithium negative electrode, or decomposed by high voltage of a positive electrode. Furthermore, if an electrolyte membrane containing the non-volatile electrolyte is formed in a single layer, it is difficult to maintain excellent rigidity at both the positive electrode and the negative electrode due to the side reaction of the electrode.

SUMMARY

In preferred aspects, provided is a folding type lithium air battery that may include a multi-layered separator including a first electrolyte membrane, a diffusion prevention membrane, and a second electrolyte membrane, which contain a non-volatile electrolyte and ionic liquids that are suitable for a positive electrode and a negative electrode, respectively.

In an aspect, provided is a folding type lithium air battery, in which a separator is bent to surround edges of a positive electrode composite and a negative electrode composite, thus having a zigzag shape.

The term "folding type" as used herein refers to one or more components that may be bent, stacked, and/or rearranged into a flatter or more compact shape and/or form a stack. For example, the "folding type battery" may be a battery that includes one or more components (e.g., separators, positive electrode composites, and negative electrode composites) are positioned to form a stack that includes multiple layers of these components. Preferably, the one or more components of the folding type battery may be in a form of layer or plate-like shape so as to form the stack where those layers are closely contact to each other.

In an aspect, provided is a folding type lithium air battery including a positive electrode composite, a negative electrode composite, and a separator. The separator may be positioned between the positive electrode composite and the negative electrode composite, and may be bent to surround one edge of the positive electrode composite and an opposite edge of the negative electrode composite that is opposite to one edge of the positive electrode composite, thus forming a zigzag shape. The separator may include a first electrolyte membrane that is in contact with the positive electrode composite; a second electrolyte membrane that is in contact with the negative electrode composite; and a diffusion prevention membrane that is positioned between the first electrolyte membrane and the second electrolyte membrane.

The first electrolyte membrane may include a first reinforcing layer; and a first electrolyte solution impregnated in the first reinforcing layer, and the second electrolyte membrane may include a second reinforcing layer; and a second electrolyte solution impregnated in the second reinforcing layer.

The first electrolyte membrane may include the first reinforcing layer and the first electrolyte solution in a weight ratio of about 1:1 to 3, and the second electrolyte membrane may contain the second reinforcing layer and the second electrolyte solution in a weight of about 1:1 to 3.

The first electrolyte solution may include an amount of about 45 to 60 wt % of a first ionic liquid, an amount of about 25 to 30 wt % of a first polymer, and an amount of about 15 to 25 wt % of a first lithium salt, and the second electrolyte solution may include an amount of about 45 to 60 wt % of a second ionic liquid, an amount of about 25 to 30 wt % of a second polymer, and an amount of about 15 to 25 wt % of a second lithium salt.

The first ionic liquid may include one or more selected from the group consisting of 1-Ethyl-3-methylimidazolium bis(trifluoromethanesulfonyl)imide (EMIm-TFSI), 1-Ethyl-3-methylimidazolium bis(fluorosulfonyl)imide (EMIm-FSI), N-trimethyl-N-propylammonium bis(trifluoromethanesulfonyl)imide ($N_{1113}$-TFSI), N-trimethyl-N-propylammonium bis(fluorosulfonyl)imide ($N_{1113}$-FSI), N-Diethyl-N-methyl-N-(2-methoxyethyl)ammonium bis(trifluoromethanesulfonyl)imide (DEME-TFSI), N-Diethyl-N-methyl-N-(2-methoxyethyl)ammonium bis(fluorosulfonyl)imide (DEME-FSI), 1-butyl-1-methylpyrrolidinium bis(trifluoromethanesulfonyl)imide ($P_{14}$-TFSI), and 1-butyl-1-methylpyrrolidinium bis(fluorosulfonyl)imide ($P_{14}$-FSI).

The second ionic liquid may include one or more selected from the group consisting of N-methyl-N-propylpyrrolidinium bis(trifluoromethanesulfonyl)imide (P$_{13}$-TFSI), N-methyl-N-propylpyrrolidinium bis(fluorosulfonyl)imide (P$_{13}$—FSI), N-methyl-N-propylpiperidinium bis(trifluoromethanesulfonyl)imide (PP$_{13}$-TFSI), N-methyl-N-propylpiperidinium bis(fluorosulfonyl)imide (PP$_{13}$-FSI), 1-butyl-1-methylpiperidinium bis(trifluoromethanesulfonyl)imide (PPN-TFSI), and 1-butyl-1-methylpiperidinium bis(fluorosulfonyl)imide (PPN-FSI).

The first polymer or the second polymer may include one or more selected from the group consisting of polyvinylidene fluoride, polymethyl methacrylate, polyethylene oxide, polystyrene, poly(diallyldimethylammonium bis(trifluoromethanesulfonyl)imide (PDDA-TFSI), and poly(diallyldimethylammonium bis(fluorosulfonyl)imide (PDDA-FSI).

The first lithium salt or the second lithium salt may be selected from the group consisting of LiTFSI, LiFSI, LiNO$_3$, and LiBr.

The first electrolyte membrane may further include an amount of about 0.1 to 10 parts by weight of one or more additives selected from the group consisting of CsI, LiI, and LiNO$_3$, based on 100 parts by weight of the first electrolyte solution, and the second electrolyte membrane may further include an amount of about 0.1 to 10 parts by weight of one or more additive selected from the group consisting of CsI, LiI, and LiNO$_3$, based on 100 parts by weight of the second electrolyte solution. Each of the first electrolyte membrane and the second electrolyte membrane may have a thickness of about 5 to 200 μm.

Each of the first reinforcing layer and the second reinforcing layer may have porosity of about 30 to 90% and a thickness of about 3 to 100 μm.

Each of the first reinforcing layer and the second reinforcing layer may include one or more selected from the group consisting of polyethylene, polyethylene terephthlate, polypropylene, polytetrafluoroethylene, polyvinylidene fluoride, polyimide, cellulose, and glass fiber.

The diffusion prevention membrane may be selected from the group consisting of a sulfide-based solid electrolyte, and an oxide-based solid electrolyte, which may have lithium ion conductivity.

The positive electrode composite may include a first positive electrode, a second positive electrode, and a porous structure positioned between the first positive electrode and the second positive electrode, and the negative electrode composite may include a first negative electrode, a second negative electrode, and a negative electrode current collector positioned between the first negative electrode and the second negative electrode.

The positive electrode composite may be configured such that the porous structure is stacked between the first positive electrode and the second positive electrode, or one surface and both edges of each of the first positive electrode and the second positive electrode are embedded in the porous structure, and the other surface of each of the first positive electrode and the second positive electrode forms the same layer as the porous structure.

The folding type lithium air battery may have an electrode length ratio satisfying the following Equation 1, Electrode length ratio: positive electrode(L2)≤negative electrode(L4)<separator(L3)≤porous structure(L1)    [Equation 1]

(in Equation 1, the positive electrode (L2) is the first positive electrode or the second positive electrode, and the negative electrode (L4) is the first negative electrode or the second negative electrode.)

In an aspect, provided is a method for manufacturing a folding type lithium air battery including a positive electrode composite, a negative electrode composite, and a separator positioned between the positive electrode composite and the negative electrode composite, the method including: (a) preparing the separator; (b) bonding the separator on both surfaces of the positive electrode composite by bending to surround one edge of the positive electrode composite; (c) bonding a surface of the negative electrode composite on the separator; (d) bonding the separator on the other surface of the negative electrode composite by bending to surround an opposite edge of the negative electrode composite that is opposite to one edge of the positive electrode composite; (e) stacking two or more positive electrode composites and negative electrode composites with the separator therebetween in series to manufacture a unit cell by repeatedly performing (b) to (d); and (f) manufacturing the folding type lithium air battery by pressing the unit cell at high temperature.

The preparing of the separator may include: forming a first electrolyte membrane by impregnating a first electrolyte solution including first ionic liquid, a first polymer and a first lithium salt in a first reinforcing layer; forming a diffusion prevention membrane on the first electrolyte membrane; forming a second electrolyte membrane by impregnating a second electrolyte solution including a second ionic liquid, a second polymer and a second lithium salt in a second reinforcing layer; and forming a second electrolyte membrane on the diffusion prevention membrane.

The (f) may be performed by a hot pressing process at temperature of about 70 to 100° C. and pressure of about 1 to 5 bars.

The folding type lithium air battery according to various exemplary embodiments of the present invention is configured such that a first electrolyte membrane and a second electrolyte membrane containing ionic liquids that are suitable for a positive electrode composite and a negative electrode composite, respectively, may be formed, and a separator including a diffusion prevention membrane is applied between the first electrolyte membrane and the second electrolyte membrane. Thus, electrode stability may be secured and the deterioration of durability and the volatilization of an electrolyte due to the transfer and diffusion of materials may be prevented. Furthermore, stability may be improved by reducing the risk of explosion or fire due to the existing volatile liquid electrolyte solution.

The separator of the folding type lithium air battery according to various exemplary embodiments of the present invention is configured such that the first electrolyte membrane and the second electrolyte membrane include reinforcing layers to improve durability and mechanical properties and simultaneously enhance battery performance owing to excellent ionic conductivity.

Further, the folding type lithium air battery according to various exemplary embodiments of the present invention is configured such that positive electrode composites and negative electrode composites are repeatedly stacked with the separator therebetween, and the separator is bent to surround edges of the positive electrode composite and the negative electrode composites, thus forming a battery in a zigzag shape. Thereby, a battery capacity and a battery life may be increased due to the improved energy density, and simultaneously the short circuit of the electrode may be prevented, and air may be smoothly supplied and discharged, thus improving battery performance.

The effects of the present invention are not limited to the above-mentioned effects. It should be understood that the effects of the invention include all effects deduced from the following description.

DETAILED DESCRIPTION

Figure 1:
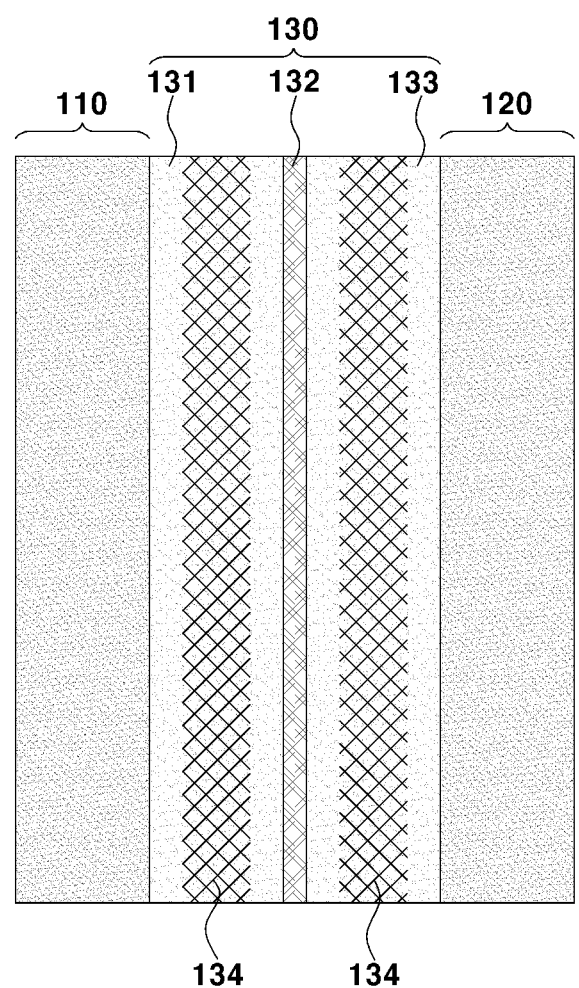
FIG. 1 is a sectional view showing an exemplary separator of an exemplary folding type lithium air battery according to an exemplary embodiment of the present invention.

The above and other objects, features, and other advantages of the present invention will be more clearly understood from the following detailed description when taken in conjunction with the accompanying drawings. However, the invention should not be construed as limited to the embodiments set forth herein. Rather, the embodiments described herein are provided to make an invention thorough and complete and to fully convey the spirit of the present invention to those skilled in the art.

Like reference numerals in the drawings denote like elements. In the drawings, dimensions of structures may be exaggerated for clarity. Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. A singular form may include a plural from as long as it is not specifically mentioned in a sentence.

Herein, terms such as "include" or "have" represent that one or more features, numbers, steps, operations, elements, components or combinations described in the specification exist, but do not exclude the possibility of the presence or addition of one or more of other features, numbers, steps, operations, elements, components or combinations thereof. Furthermore, when a part such as a layer, a film, an area, or a sheet is placed "above" another part, this refers to a case where a part is "directly above" another part as well as a case where an intermediate part is provided between the parts. On the other hand, when a part such as a layer, a film, an area, or a sheet is placed "under" another part, this refers to a case where a part is "directly under" another part as well as a case where an intermediate part is provided between the parts.

Unless defined otherwise, since all numbers, values and/or expressions representing components, reaction conditions, polymer compositions and the amount of formulations used in this specification are essentially approximations reflecting various uncertainties occurring to obtain these values, among other things, these are modified by the term "about". Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where numerical ranges are disclosed herein, these ranges are continuous and cover all values from a minimum value to a maximum value unless otherwise indicated. Moreover, where these ranges refer to integers, all integers from a minimum value to a maximum value are included unless otherwise indicated.

Hereinafter, the present invention will be described in more detail.

The present invention relates to a folding type lithium air battery 100 or 100' and a method for manufacturing the battery. The folding type lithium air battery 100 or 100' forms a first electrolyte membrane 131 and a second electrolyte membrane 133 containing ionic liquids that are suitable for a positive electrode and a negative electrode, respectively. A separator 130 including a diffusion prevention membrane 132 is applied between the first electrolyte membrane 131 and the second electrolyte membrane 133, so that it is possible to secure electrode stability and to prevent the deterioration of durability and the volatilization of an electrolyte due to the transfer and diffusion of materials. Furthermore, stability can be improved by reducing the risk of explosion or fire due to the existing volatile liquid electrolyte solution.

The first electrolyte membrane 131 and the second electrolyte membrane 133 of the separator 130 may include reinforcing layers to improve durability and mechanical properties and simultaneously enhance battery performance due to excellent ionic conductivity. In addition, positive electrode composites 110 or 110' and negative electrode composites 120 may be repeatedly stacked with the separator 130 therebetween. The separator 130 may be bent to surround edges of the positive electrode composite 110 or 110' and the negative electrode composites 120, thus forming a battery in a zigzag shape. Thereby, battery capacity and battery life may be increased due to the improved energy density, and simultaneously the short circuit of the electrode may be prevented, and air may be smoothly supplied and discharged, thus improving battery performance.

Preferably, the folding type lithium air battery 100 or 100' may include the positive electrode composite 110 or 110', the negative electrode composite 120, and the separator 130. The separator 130 is positioned between the positive electrode composite 110 or 110' and the negative electrode composite 120 and may be bent to surround one edge of the positive electrode composite 110 or 110' and an opposite edge of the negative electrode composites 120 that is opposite to one edge of the positive electrode composites 110 or 110', thus forming a zigzag shape. The separator 130 may include a first electrolyte membrane 131 that is in contact with the positive electrode composite 110 or 110', a second electrolyte membrane 133 that is in contact with the negative electrode composite 120, and a diffusion prevention membrane 132 that is positioned between the first electrolyte membrane 131 and the second electrolyte membrane 133.

FIG. 1 is a sectional view showing an exemplary separator 130 of a folding type lithium air battery 100 or 100' according to an exemplary embodiment of the present invention. FIG. 1 shows that the separator 130 includes a first electrolyte membrane 131 bonded to the positive electrode composite 110 or 110', and a second electrolyte membrane 133 bonded to the negative electrode composite 120, and a diffusion prevention membrane 132 is formed between the first electrolyte membrane 131 and the second electrolyte membrane 133. Furthermore, since the first electrolyte membrane 131 and the second electrolyte membrane 133 include a first reinforcing layer 134 and a second reinforcing layer 135, the mechanical properties and the ionic conductivity of the electrolyte membrane can be simultaneously improved.

The first electrolyte membrane 131 may include the first reinforcing layer 134, and a first electrolyte solution impregnated in the first reinforcing layer 134. The second electrolyte membrane 133 may include a second reinforcing layer 135, and a second electrolyte solution impregnated in the second reinforcing layer 135. Here, the first electrolyte membrane 131 may include the first reinforcing layer 134 and the first electrolyte solution in the weight ratio of about 1:1 to 3, while the second electrolyte membrane 133 may include the second reinforcing layer 135 and the second electrolyte solution in the weight of about 1:1 to 3.

When the mixing ratio of the first reinforcing layer 134 and the first electrolyte solution in the first electrolyte membrane 131 is less than about 1:1 by weight, the ionic conductivity of the electrode may be improved, but the weight of the battery increases, so that fuel efficiency may be lowered. The mixing ratio of the second reinforcing layer 135 and the second electrolyte solution in the second electrolyte membrane 133 may have the same critical significance as the first electrolyte membrane 131.

The first electrolyte solution may include an amount of about 45 to 60 wt % of a first ionic liquid, an amount of about 25 to 30 wt % of a first polymer, and an amount of about 15 to 25 wt % of a first lithium salt, based on the total weight of the first electrolyte solution. The second electrolyte solution may include an amount of about 45 to 60 wt % of a second ionic liquid, an amount of about 25 to 30 wt % of a second polymer, and an amount of about 15 to 25 wt % of a second lithium salt, based on the total weight of the second electrolyte solution. The first electrolyte solution may inhibit a polymer decomposition reaction by an active oxygen radical at a positive electrode, and the second electrolyte solution may inhibit a reductive decomposition reaction of lithium at a negative electrode, thus enhancing a battery's life. When the contents of the first ionic liquid and the second ionic liquid are less than about 45 wt %, the ionic conductivity may be reduced and consequently battery performance may be degraded. On the contrary, when the contents of the first ionic liquid and the second ionic liquid are greater than about 60 wt %, the ionic conductivity may be increased, but the properties of the electrolyte may be degraded and then it may be difficult to form the appearance of the electrolyte membrane.

The first ionic liquid may be the ionic liquid that is resistant to high voltage at the positive electrode composite 110 or 110' and has strong corrosion resistance to the oxygen radical that is an intermediate reaction product. The first ionic liquid may suitably include one or more selected from the group consisting of 1-Ethyl-3-methylimidazolium bis(trifluoromethanesulfonyl)imide (EMIm-TFSI), 1-Ethyl-3-methylimidazolium bis(fluorosulfonyl)imide (EMIm-FSI), N-trimethyl-N-propylammonium bis(trifluoromethanesulfonyl)imide ($N_{1113}$-TFSI), N-trimethyl-N-propylammonium bis(fluorosulfonyl)imide ($N_{1113}$-FSI), N-Diethyl-N-methyl-N-(2-methoxyethyl)ammonium bis(trifluoromethanesulfonyl)imide (DEME-TFSI), N-Diethyl-N-methyl-N-(2-methoxyethyl)ammonium bis(fluorosulfonyl)imide (DEME-FSI), 1-butyl-1-methylpyrrolidinium bis(trifluoromethanesulfonyl)imide ($P_{14}$-TFSI), and 1-butyl-1-methylpyrrolidinium bis(fluorosulfonyl)imide ($P_{14}$-FSI). The first electrolyte solution containing the first ionic liquid may prevent the polymer decomposition reaction by the active oxygen radical produced at the positive electrode composite 110 or 110' during charging and discharging, thus improving battery life characteristics.

The second ionic liquid may have excellent chemical resistance to the negative electrode composite 120 without breaking a surface that is bonded to the second electrolyte membrane 133 even if the volume of the negative electrode composite 120 changes. The second ionic liquid may suitably include one or more selected from the group consisting of N-methyl-N-propylpyrrolidinium bis(trifluoromethanesulfonyl)imide ($P_{13}$-TFSI), N-methyl-N-propylpyrrolidinium bis(fluorosulfonyl)imide ($P_{13}$-FSI), N-methyl-N-propylpiperidinium bis(trifluoromethanesulfonyl)imide ($PP_{13}$-TFSI), N-methyl-N-propylpiperidinium bis(fluorosulfonyl)imide ($PP_{13}$-FSI), 1-butyl-1-methylpiperidinium bis(trifluoromethanesulfonyl)imide ($PP_{13}$-TFSI), and 1-butyl-1-methylpiperidinium bis(fluorosulfonyl)imide ($PP_{14}$-FSI). The second electrolyte solution containing the second ionic liquid may prevent a reductive decomposition reaction by lithium when coming into contact with the negative electrode composite 120, thus improving battery life characteristics.

The polymer (i.e. first polymer and second polymer) may have excellent chemical resistance and corrosion resistance to the positive electrode composite 110 or 110' and the negative electrode composite 120 and may be excellent in preventing flowability and maintaining the shape of the electrolyte membrane. The polymer may suitably include one or more selected from the group consisting of polyvinylidene fluoride, polymethyl methacrylate, polyethylene oxide, polystyrene, poly(diallyldimethylammonium bis(trifluoromethanesulfonyl)imide (PDDA-TFSI), poly(diallyldimethylammonium bis(fluorosulfonyl)imide (PDDA-FSI)

and combinations thereof. Polymers contained in the first electrolyte solution and the second electrolyte solution may be equal to or different from each other. When the content of the polymer is less than about 45 wt %, it is difficult to prevent the flowability of the electrolyte membrane. On the contrary, when the content of the polymer is greater than about 60 wt %, the ionic conductivity may be significantly reduced.

The lithium salt (i.e. first lithium salt and second lithium salt) may suitably include one or more selected from the group consisting of LiTFSI, LiFSI, LiNO$_3$, LiBr. Lithium salts contained in the first electrolyte solution and the second electrolyte solution may be equal to or different from each other. When the content of the lithium salt is less than about 15 wt %, the battery performance may be degraded. On the contrary, when the content of the lithium salt is greater than about 25 wt %, the lithium salt may not be dissolved in the ionic liquid any more, thus making it difficult to prepare an electrolyte solution.

The first electrolyte membrane 131 may further include an amount of about 0.1 to 10 parts by weight of one or more additives selected from the group consisting of CsI, LiI, LiNO$_3$, based on 100 parts by weight of the first electrolyte solution. The second electrolyte membrane 133 may further include an amount of about 0.1 to 10 parts by weight of one or more additives selected from the group consisting of CsI, LiI, LiNO$_3$ and combinations thereof, based on 100 parts by weight of the second electrolyte solution. The additives may be mixed with each other to improve the durability of the first electrolyte membrane 131 and the second electrolyte membrane 133. When the content of the additive is less than about 0.1 parts by weight, the effect of improving the durability may not be sufficient. On the contrary, when the content of the additive is greater than about 10 parts by weight, the effect of improving the durability may not be obtained.

Each of the first electrolyte membrane 131 and the second electrolyte membrane 133 may have the thickness of about 5 to 200 μm. In this regard, when the thickness of each of the first electrolyte membrane 131 and the second electrolyte membrane 133 is less than about 5 μm, it may be difficult to secure the mechanical strength of the electrolyte membrane, and a short circuit may occur during an operation. On the contrary, when the thickness is greater than about 200 μm, the battery performance may be degraded due to a reduction in ionic conductivity.

The first reinforcing layer 134 and the second reinforcing layer 135 may have the porosity of about 30 to 90% and the thickness of about 3 to 100 μm so as to satisfy smooth impregnation with the first electrolyte solution and the second electrolyte solution and excellent mechanical strength. In this regard, when the thickness of each of the first reinforcing layer 134 and the second reinforcing layer 135 is less than about 3 μm, it is difficult to secure mechanical rigidity. On the contrary, when the thickness is greater than about 100 μm, the ionic conductivity may be reduced. Furthermore, when the porosity of each of the first reinforcing layer 134 and the second reinforcing layer 135 is less than about 30%, the impregnation of the first ionic liquid and the second ionic liquid may be difficult and the ionic conductivity may be low. On the contrary, when the porosity of each of the first reinforcing layer 134 and the second reinforcing layer 135 is greater than about 95%, it is difficult to secure the mechanical rigidity, and a short circuit may occur due to the formation of lithium dendrite during charging and discharging. Preferably, the porosity may suitably in a range of about 45 to 90%.

The first reinforcing layer 134 and the second reinforcing layer 135 may be configured such that contact angles of the first electrolyte solution and the second electrolyte solution with surfaces of the first reinforcing layer 134 and the second reinforcing layer 135 are about 5 to 90°. When the contact angle is less than about 5°, the flowability of the electrolyte solution is too large to prepare the electrolyte membrane. On the contrary, when the contact angle is greater than 90°, the impregnation with the ionic liquid may be difficult and the ionic conductivity may be low. Preferably, the contact angle may be in a range of about 20 to 80°.

Each of the first reinforcing layer 134 and the second reinforcing layer 135 may suitably include one or more selected from the group consisting of polyethylene, polyethylene terephthlate, polypropylene, polytetrafluoroethylene, polyvinylidene fluoride, polyimide, cellulose, and glass fiber.

The diffusion prevention membrane 132 may serve to prevent the first electrolyte solution of the first electrolyte membrane 131 and the second electrolyte solution of the second electrolyte membrane 133 from being mixed with each other or to prevent organic ion components from being diffused. Furthermore, this may be a lithium ion conductor of an organic or inorganic component to prevent electrochemical decomposition at the positive electrode and the negative electrode. The diffusion prevention membrane 132 may suitably include one or more of a sulfide-based solid electrolyte, and an oxide-based solid electrolyte. The sulfide-based solid electrolyte and the oxide-based solid electrolyte may use any materials that are known to those skilled in the art. For example, the sulfide-based solid electrolyte may suitably include one or more selected from the group consisting of Li$_2$S—P$_2$S$_5$, Li$_2$S—P$_2$S$_5$—LiI, Li$_2$S—P$_2$S$_5$—LiCl, Li$_2$S—P$_2$S$_5$—LiBr, Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$-Z$_m$S$_n$ (m and n are positive numbers, and Z is one of Ge, Zn, and Ga), Li$_2$S—GeS$_2$, Li$_2$S—SiS$_2$—Li$_3$PO$_4$, Li$_2$S—SiS$_2$-Li$_x$MO$_y$ (x and y are positive numbers, and M is one of P, Si, Ge, B, Al, Ga, and In), and Li$_{10}$GeP$_2$Si$_2$. Furthermore, the oxide-based solid electrolyte may suitably include a Garnet-type solid electrolyte such as Li$_7$La$_3$Zr$_2$O$_{12}$ (LLZO), a NASICON-type solid electrolyte such as Na$_{1+x}$Zr$_2$Si$_2$P$_{3-x}$O$_{12}$ (0≤x≤3), a LISICON-type solid electrolyte such as γ-Li$_3$PO$_4$, a Perovskite-type solid electrolyte and the like.

Figure 2:
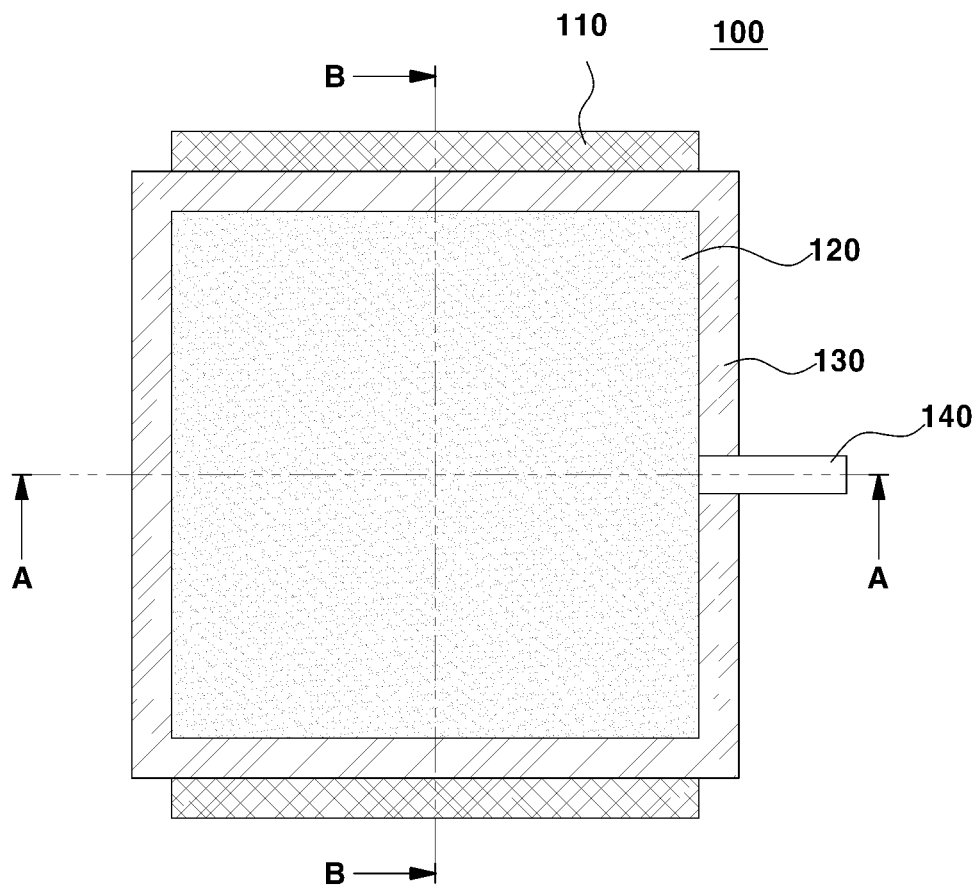
FIG. 2 is a plan view of an exemplary folding type lithium air battery according to an exemplary embodiment of the present invention.

FIG. 2 is a plan view of an exemplary lithium air battery 100 according to an exemplary embodiment of the present invention. The separator 130 is formed between the positive electrode composite 110 and the negative electrode composite 120. Furthermore, in the case of the positive electrode composite 110, it is shown that the length of a porous structure 113 is longer than the negative electrode composite 120 and the separator 130. In addition, a current collecting tab 140 protrudes from the negative electrode composite 120.

Figure 3:
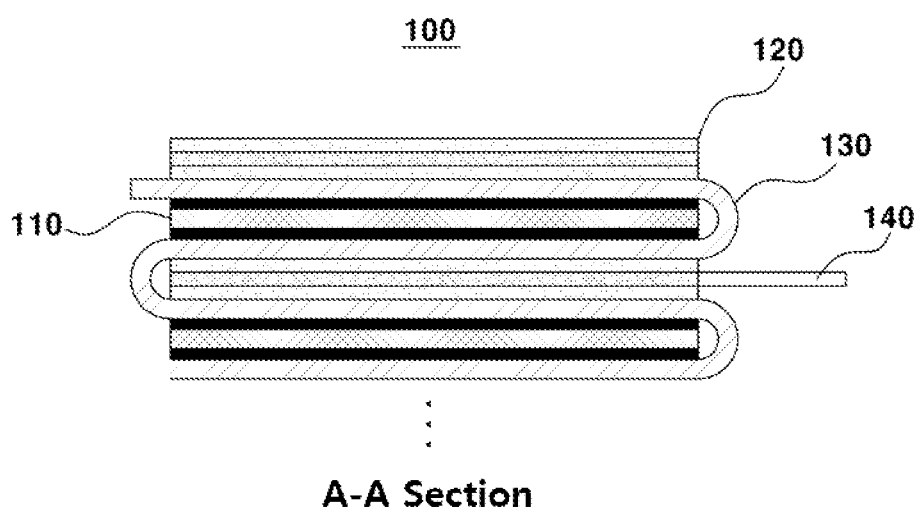
FIG. 3 is a sectional view taken along line A-A of an exemplary folding type lithium air battery according to an exemplary embodiment of the present invention.

FIG. 3 is a sectional view taken along line A-A of an exemplary lithium air battery 100 according to an exemplary embodiment of the present invention. The positive electrode composite 110 and the negative electrode composite 120 are alternately stacked with the separator 130 therebetween. The separator 130 is in contact with one surface of the positive electrode composite 110, is bent to surround one edge, and then is in contact with the other surface of the positive electrode composite 110. Furthermore, the negative electrode composite 120 is stacked on the separator 130, the separator 130 is in contact with one surface of the negative electrode composite 120, is bent to surround an opposite edge of the negative electrode composite 120 that is opposite to the one edge of the positive electrode composite 110, and then is in contact with the other surface of the negative electrode composite 120.

Two or more positive electrode composites 110 and negative electrode composites 120 may be stacked in series with the separator 130 therebetween. When the positive electrode composites 110 and the negative electrode composites 120 are alternately stacked in a zigzag shape with the separator 130 therebetween, a bonding force between electrodes can be increased. Thus, even if shocks are applied to the battery, the occurrence of a short circuit caused by the push of the electrode can be prevented.

The positive electrode composite 110 or 110' may include a first positive electrode 111 or 111', a second positive electrode 112 or 112', and a porous structure 113 or 113' positioned between the first positive electrode 111 or 111' and the second positive electrode 112 or 112'. Preferably, the positive electrode composite 110 or 110' may be configured such that the porous structure 113 is stacked between the first positive electrode 111 and the second positive electrode 112, or one surface and both edges of each of the first positive electrode 111' and the second positive electrode 112' are embedded in the porous structure 113', and the other surface of each of the first positive electrode 111' and the second positive electrode 112' forms the same layer as the porous structure 113'.

Figure 4:
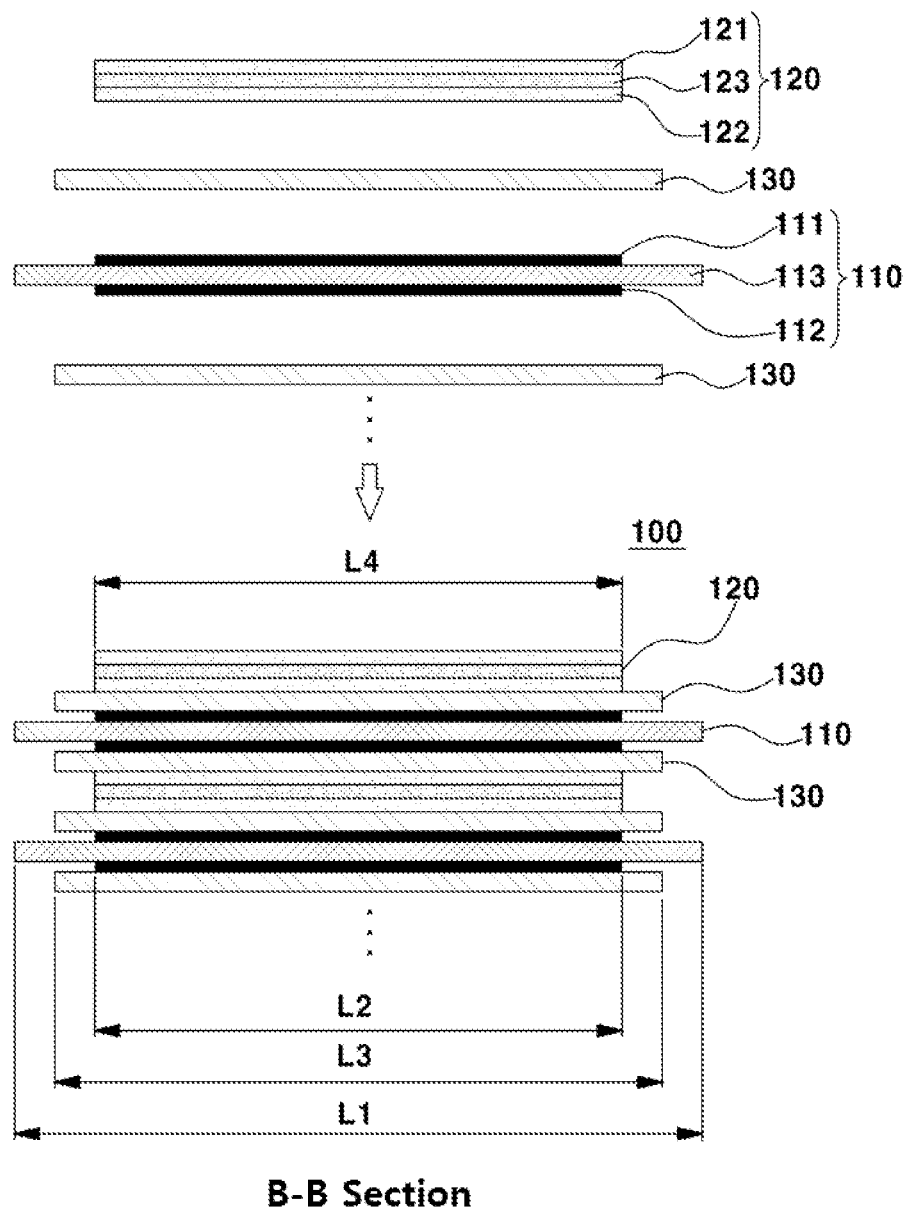
FIG. 4 is a sectional view taken along line B-B of an exemplary folding type lithium air battery according to an exemplary embodiment of the present invention.

FIG. 4 is a sectional view taken along line B-B of the lithium air battery 100 according to an exemplary embodiment of the present invention. The separator 130 is bonded between the positive electrode composite 110 and the negative electrode composite 120. Particularly, the positive electrode composite 110 of FIG. 4 is configured such that the porous structure 113 is stacked between the first positive electrode 111 and the second positive electrode 112. In this regard, it is shown that the first positive electrode 111 or the second positive electrode 112 has the same length as the negative electrode composite.

Figure 5:
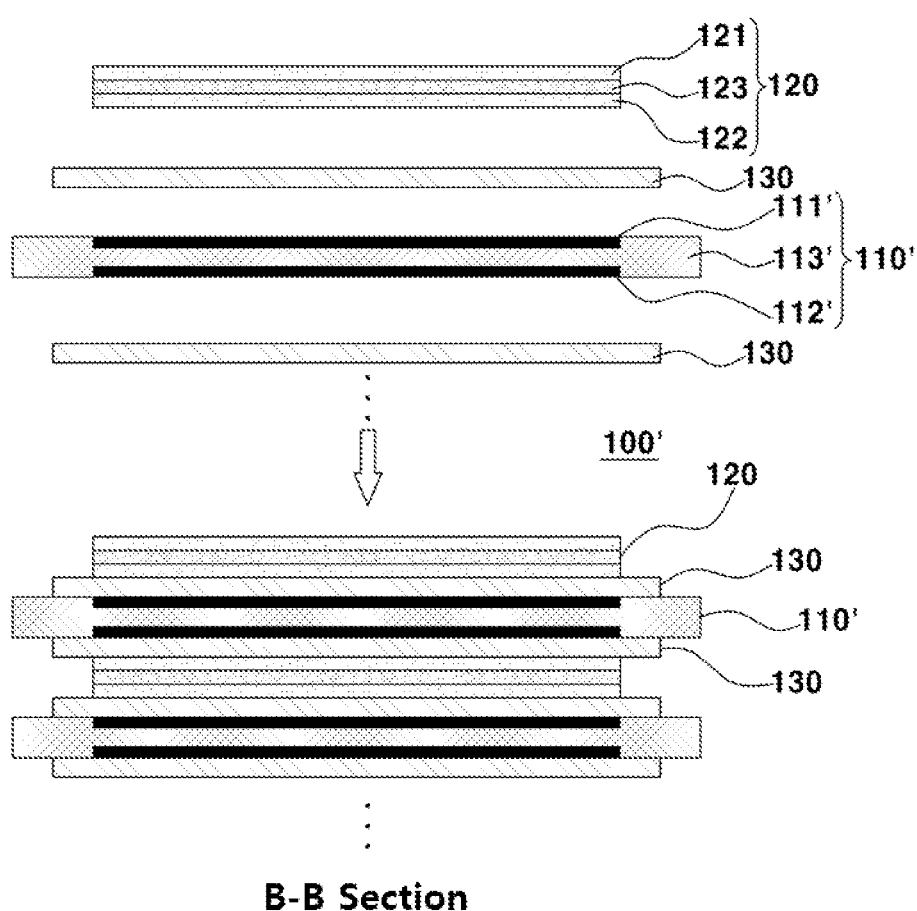
FIG. 5 is a sectional view taken along line B-B' of an exemplary folding type lithium air battery according to an exemplary embodiment of the present invention.

FIG. 5 is a sectional view taken along line B-B' of the lithium air battery 100' according to an exemplary embodiment of the present invention. The entire structure of the lithium air battery 100' is the same as that of FIG. 3. However, the positive electrode composite 110' of FIG. 5 is configured such that one surface and both edges of each of the first positive electrode 111' and the second positive electrode 112' are embedded in the porous structure 113'. In this regard, the other surface of each of the first positive electrode 111' and the second positive electrode 112' form the same layer as the porous structure 113'. As such, the positive electrode composite 110' is advantageous in that the first positive electrode 111' and the second positive electrode 112' are embedded in the porous structure 113', so that the thickness and volume of the battery can be reduced.

The folding type lithium air battery 100 or 100' may have an electrode length ratio satisfying the following Equation 1.

Electrode length ratio: positive electrode $L2 \leq$ negative electrode $L4 <$ separator $L3 \leq$ porous structure $L1$    [Equation 1]

(in Equation 1, the positive electrode L2 is the first positive electrode or the second positive electrode, and the negative electrode L4 is the first negative electrode or the second negative electrode.)

As shown in FIGS. 4 and 5, the electrode length of the porous structure L1 should be formed to be longer than the separator L3. As such, when the length of the porous structure L1 is formed long, this allows the supply of reaction gas and the discharge of product gas to be smoothly performed, thereby improving the battery performance. The separator L3 may be equal to or shorter in length than the porous structure L1 so as to form the porous structure L1 long. Furthermore, in order to prevent the short circuit between the separator L3 and the positive electrode L2 or the negative electrode L4, the separator is preferably longer than the positive electrode L2 and the negative electrode L4. In addition, the positive electrode L2 may be equal or shorter in electrode length to or than the negative electrode L4. Particularly, when the positive electrode L2 is shorter in electrode length than the negative electrode L4, the short circuit caused by the growth of the lithium dendrite at the negative electrode can be prevented.

In the positive electrode composite 110 or 110', the first positive electrode 111 or 111' and the second positive electrode 112 or 112' each contain a carbon material and a binder. In this regard, the first positive electrode 111 or 111' and the second positive electrode 112 or 112' may serve to reduce oxygen.

The carbon material may suitably include one or more selected from the group consisting of active carbon, carbon nanotube, carbon nano fiber, and carbon carrying a metal-oxide-based catalyst. Particularly, the carbon carrying the metal-oxide-based catalyst may be include carbon carrying the metal-oxide-based catalyst selected from the group consisting of cobalt oxide, ruthenium oxide, iridium oxide, manganese oxide, nickel oxide, and titanium oxide.

The binder may suitably include one or more selected from the group consisting of polyvinylidene fluoride, polytetrafluoroethylene, styrene-butadiene rubber, and ethylene oxide.

The porous structure 113 or 113' may serve to supply or discharge oxygen or air. For example, the porous structure 113 or 113' may include a carbon porous body or a metal foam.

The carbon porous body may suitably include one or more of carbon felt, carbon paper, and carbon cloth. The carbon cloth may be a sheet-shaped fabric using carbon fiber.

The negative electrode composite 120 may include a first negative electrode 121, a second negative electrode 122, and a negative electrode current collector 123 positioned between the first negative electrode 121 and the second negative electrode 122. In this regard, each of the first negative electrode 121 and the second negative electrode 122 may be lithium metal. The negative electrode current collector 123 may serve as a moving path of the battery. The negative electrode current collector 123 may be selected from the group consisting of copper, nickel, stainless steel, molybdenum, tungsten, and tantalum. The negative electrode current collector 123 may further include the current collecting tab 140 protruding in one direction.

Provided is a method for manufacturing the folding type lithium air battery 100 or 100' including the positive electrode composite, the negative electrode composite 120, and the separator 130 positioned between the positive electrode composite and the negative electrode composite 120. The method may include: (a) the step of preparing the separator 130; (b) the step of bonding the separator 130 on both surfaces of the positive electrode composite by bending to surround one edge of the positive electrode composite; (c) the step of bonding a surface of the negative electrode composite 120 on the separator 130; (d) the step of bonding the separator 130 on the other surface of the negative electrode composite 120 by bending to surround the opposite edge of the negative electrode composite 120 that is opposite to one edge of the positive electrode composite; (e) the step of stacking two or more positive electrode composites and negative electrode composites 120 with the separator 130 therebetween to manufacture a unit cell by repeatedly performing the steps (b) to (d); and (f) the step of manufacturing the folding type lithium air battery 100 or 100' by pressing the unit cell at high temperature.

The unit cell made by repeatedly performing the steps (b) to (f) may be configured such that the separator 130 may be stacked in a zigzag shape between the positive electrode composite 110 or 110' and the negative electrode composite 120 as shown in the section A-A of FIG. 2.

Figure 6:
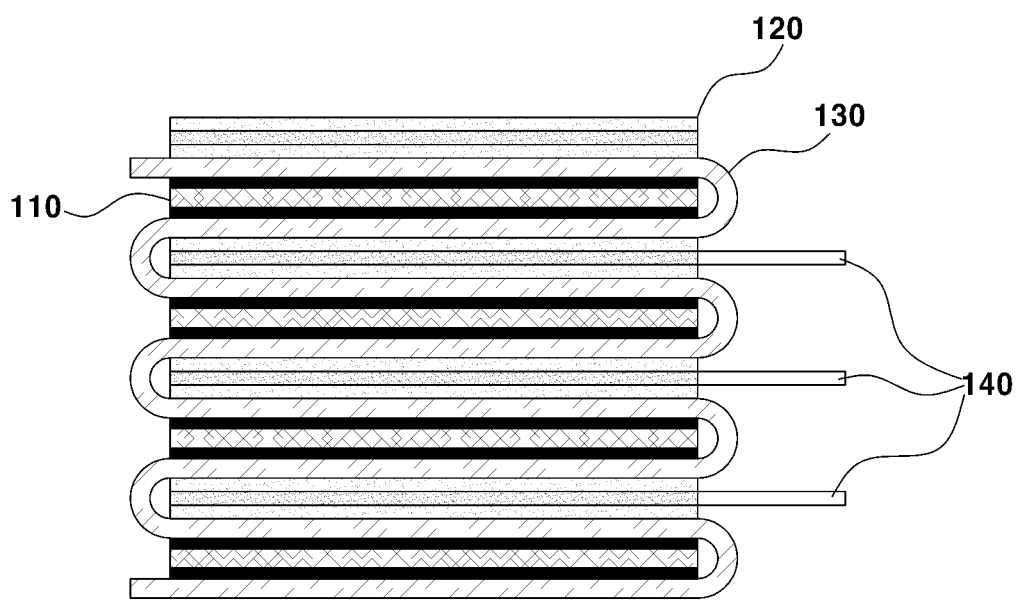
FIG. 6 is a sectional view showing an exemplary stacking structure of unit cells of an exemplary folding type lithium air battery according to an exemplary embodiment of the present invention.
Figure 7:
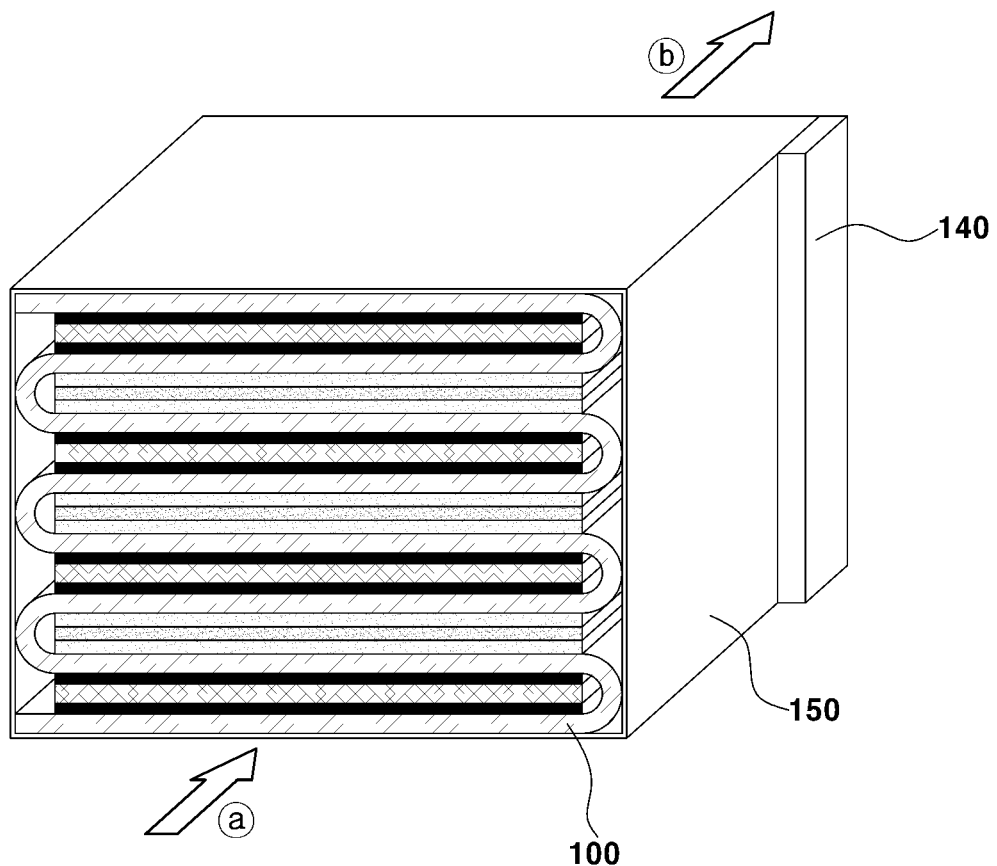
FIG. 7 is a perspective view of the unit cells of an exemplary folding type lithium air battery according to an exemplary embodiment of the present invention.

FIG. 6 is a sectional view showing an exemplary stacking structure of unit cells of an exemplary lithium air battery 100 according to an exemplary embodiment of the present invention. FIG. 7 is a perspective view of exemplary unit cells of an exemplary lithium air battery 100 according to an exemplary embodiment of the present invention. FIGS. 6 and 7 show that the unit cell made by stacking the two or more positive electrode composites 110 and negative electrode composites 120 with the separator 130 therebetween in the zigzag shape is inserted into a through-type casing 150 such that section A-A is exposed at an inlet end a and an outlet end b. Although the inlet end a and the outlet end b may be penetrated in a corresponding direction, the invention is not limited thereto and various structures making it easy to supply and discharge the reaction gas are possible. Reference character a of FIG. 7 denotes the inlet end into which the reaction gas is supplied, and reference character b denotes the outlet end from which the product gas is discharged. They may be arranged in a perpendicular direction depending on a structure. Furthermore, the unit cell may further include a separate cover that closes the inlet end a and the outlet end b to maintain pressure in the battery, thus forming an airtight structure. Preferably, pressure in the battery preferably may range from about 1 to about 10 bars. Further, the current collecting tab 140 may protrude from one surface of the casing 150. The current collecting tab 140 includes a positive electrode current collecting tab and a negative electrode current collecting tab. The current collecting tab 140 of the unit cell may be positioned in various directions for the easy use of the battery. The unit cells made through step (e) may be assembled in various structures and configurations, thus manufacturing the lithium air battery 100.

The structure in which one surface and both edges of each of the first positive electrode 111' and the second positive electrode 112' are embedded into the porous structure 113' may be manufactured through a step of bonding each of the first positive electrode 111' and the second positive electrode 112' on both surfaces of the porous structure; and a step of bonding the porous structure on both edges of each of the first positive electrode 111' and the second positive electrode 112'. In this regard, the porous structure 113' may have the same height as both edges of the first positive electrode 111' and the second positive electrode 112'. Alternatively, the structure may be manufactured by directly forming the first positive electrode 111' and the second positive electrode 112' in the porous structure 113' to be embedded into the porous structure 113'.

The step of preparing the separator 130 may include a step of forming a first electrolyte membrane 131 by impregnating a first electrolyte solution including a first ionic liquid, a first polymer and a first lithium salt in a first reinforcing layer 134; a step of forming a diffusion prevention membrane 132 on the first electrolyte membrane 131; a step of forming a second electrolyte membrane 133 by impregnating a second electrolyte solution including a second ionic liquid, a second polymer and a second lithium salt in a second reinforcing layer 135; and a step of forming a second electrolyte membrane 133 on the diffusion prevention membrane 132.

The step (f) may be performed by a hot pressing process at the temperature of about 70 to 100° C. and the pressure of about 1 to 5 bars.

EXAMPLE

Hereinafter, although the present invention has been described in detail based on the preferred embodiments, the present invention is not limited to the following embodiments.

Embodiments 1 and 2 and Comparative Examples 1 and 2

Porous carbon nanotube impregnated with the polyvinylidene fluoride binder was used as the positive electrode, while the lithium negative electrode was used as the negative electrode. Porous carbon felt was used as the porous structure 113, while SUS was used as the negative electrode current collector.

The positive electrode composite 110 was manufactured by bonding the first positive electrode 111 and the second positive electrode 112 on both surfaces of the porous structure 113. Furthermore, the negative electrode composite 120 was manufactured by bonding the first negative electrode 121 and the second negative electrode 122 on both surfaces of the negative electrode current collector 123. Next, the separator 130 was bonded on both surfaces of the positive electrode composite 110 by bending to surround one edge of the positive electrode composite 110. Subsequently, one surface of the negative electrode composite 120 is bonded on the separator 130, and the separator is bent to surround one edge of the negative electrode composite 120 and then is bonded on the other surface of the negative electrode composite 120. By repeatedly performing these processes, the unit cell was made, in which two positive electrode composites 110 and negative electrode composites 120 with the separator 130 therebetween in series are stacked in series. Subsequently, the unit cell went through the hot pressing process at a temperature of 80° C. and the temperature of 2 bars, thus manufacturing the lithium air battery 100. In this regard, the respective electrode lengths of the manufactured lithium air battery 100 were set to satisfy the following length ratio: positive electrode≤negative electrode<separator≤porous structure.

The separator 130 was manufactured by the following method. The first reinforcing layer and the second reinforcing layer were impregnated with the first electrolyte solution and the second electrolyte solution having the compositions of Table 1, respectively, thus obtaining the first electrolyte membrane and the second electrolyte membrane. In this regard, EMIm-TFSI was used as the first electrolyte solution and the second electrolyte solution. The diffusion prevention membrane containing the sulfide-based solid electrolyte was formed between the first electrolyte membrane and the second electrolyte membrane to manufacture the separator.

TABLE 1

| Classification | First electrolyte solution (wt %) | | | Second electrolyte solution (wt %) | | |
|---|---|---|---|---|---|---|
| | First ionic liquid | Polymer | Lithium salt | Second ionic liquid | Polymer | Lithium salt |
| Embodiment 1 | 45 | 30 | 25 | 45 | 30 | 25 |
| Embodiment 2 | 50 | 30 | 20 | 50 | 30 | 20 |
| Comparative Example 1 | 40 | 35 | 25 | 40 | 35 | 25 |
| Comparative Example 2 | 60 | 35 | 25 | 60 | 35 | 25 |

Embodiments 3 to 7 and Comparative Examples 3 to 7

50 wt % of first ionic liquid, 30 wt % of polymer and 20 wt % of lithium salt were mixed with each other to prepare the first electrolyte solution, and 50 wt % of second ionic liquid, 30 wt % of polymer and 20 wt % of lithium salt were mixed with each other to prepare the second electrolyte solution. The lithium air battery was manufactured by the method that is equal to that of embodiment 1 except that the kinds of the first ionic liquid and the second ionic liquid were changed as shown by the following tables 2 and 3.

TABLE 2

| Classification | First ionic liquid | second ionic liquid |
|---|---|---|
| Embodiment 3 | EMIm-TFSI | $P_{13}$-FSI |
| Comparative Example 3 | EMIm-TFSI | EMIm-TFSI |
| Comparative Example 4 | EMIm-TFSI | $PP_{14}$-TFSI |
| Comparative Example 5 | EMIm-TFSI | $N_{1113}$-IFSI |
| Comparative Example 6 | EMIm-TFSI | DEME-TFSI |

TABLE 3

| Classification | First ionic liquid | Second ionic liquid |
|---|---|---|
| Embodiment 3 | EMIm-TFSI | $P_{13}$-FSI |
| Comparative Example 3 | $P_{14}$-TFSI | $P_{13}$-FSI |
| Comparative Example 4 | DEME-TFSI | $P_{13}$-FSI |
| Comparative Example 5 | $N_{1113}$-IFSI | $P_{13}$-FSI |
| Comparative Example 6 | $P_{13}$-FSI | $P_{13}$-FSI |

Experimental Example 1: Evaluation of Ionic Conductivity and Charge/Discharge Cycle Numbers Depending on Content of First Ionic Liquid In Embodiments 1 and 2 and comparative examples 1 and 2, after the manufactured folding type lithium air battery was charged and discharged, the ionic conductivity and the number of charge and discharge cycles were evaluated. The results are shown in FIGS. 8 to 12.

Figure 8:
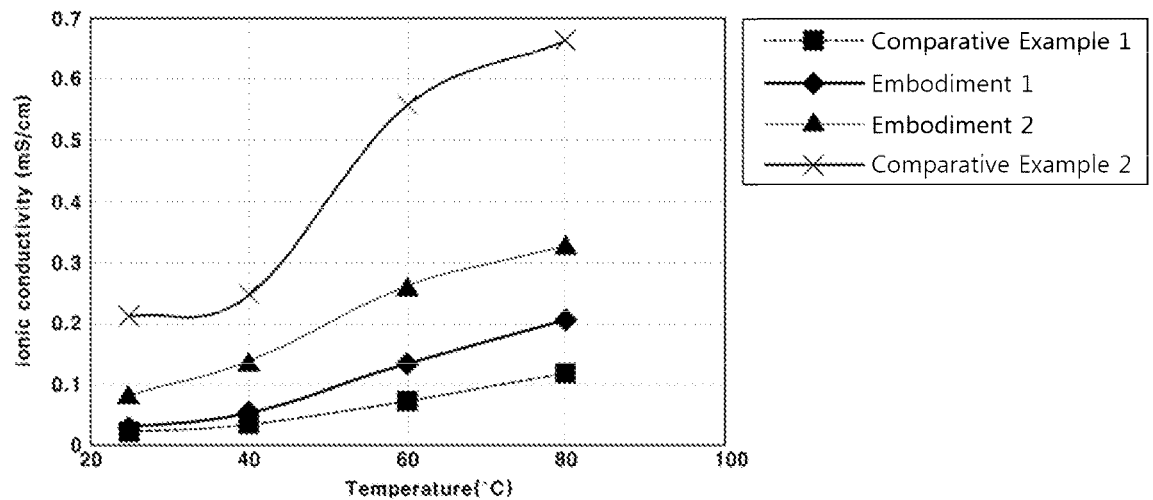
FIG. 8 is an ionic conductivity graph of folding type lithium air batteries manufactured according to exemplary Embodiments 1 and 2 of the present invention and Comparative Examples 1 and 2.
Figure 9:
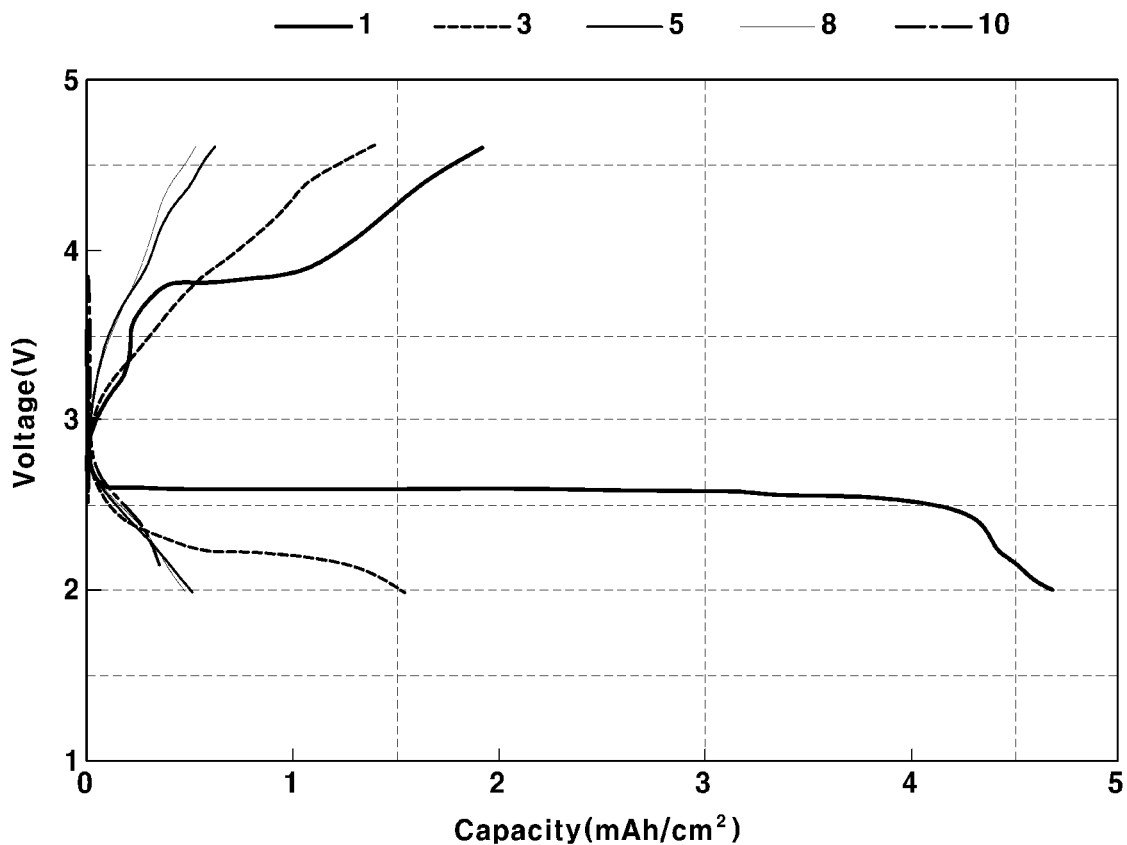
FIG. 9 is a charge and discharge graph of the folding type lithium air battery manufactured according to Embodiment 1 of the present invention.
Figure 10:
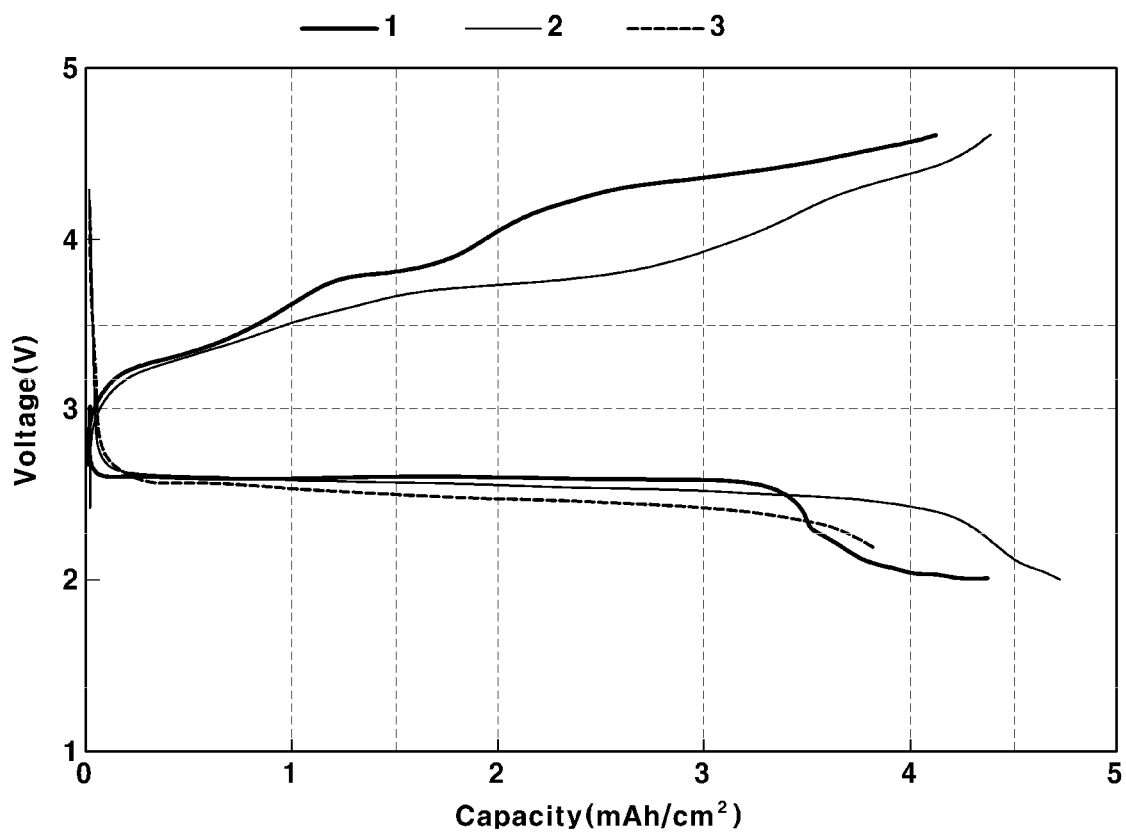
FIG. 10 is a charge and discharge graph of the folding type lithium air battery manufactured according to Embodiment 2 of the present invention.
Figure 11:
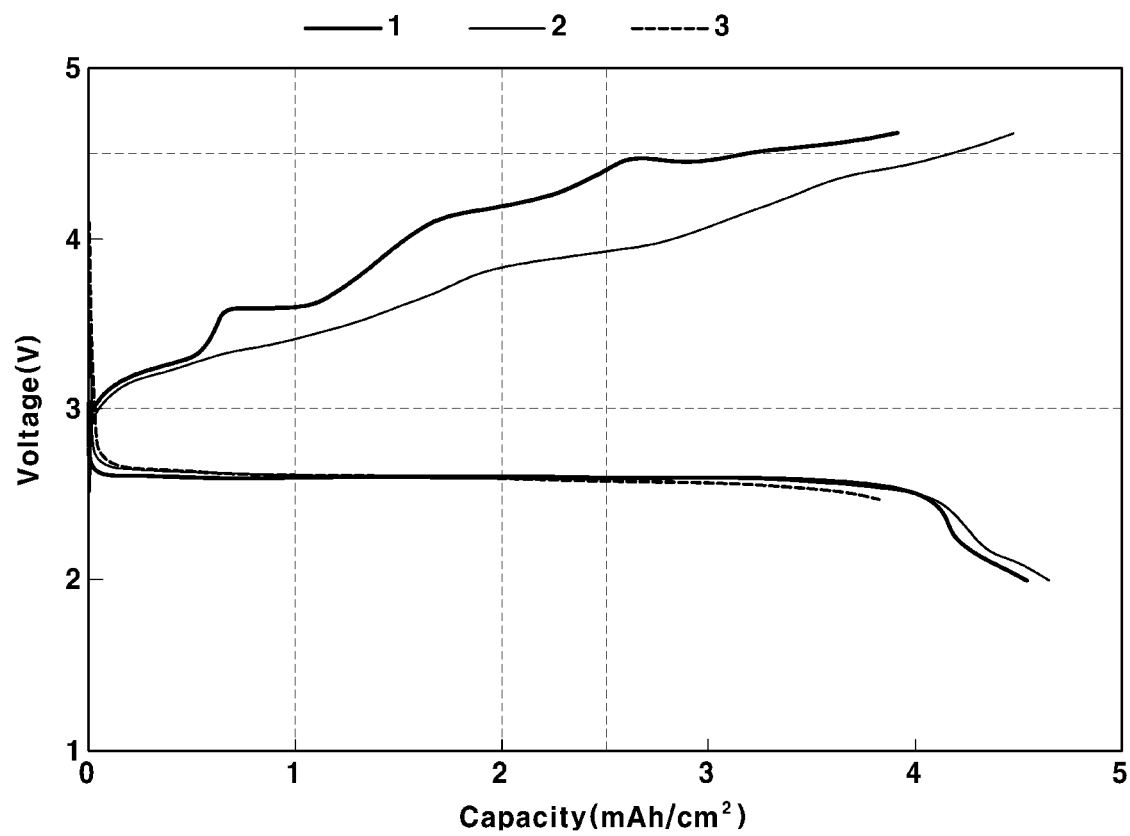
FIG. 11 is a charge and discharge graph of the folding type lithium air battery manufactured according to Comparative Example 1.
Figure 12:
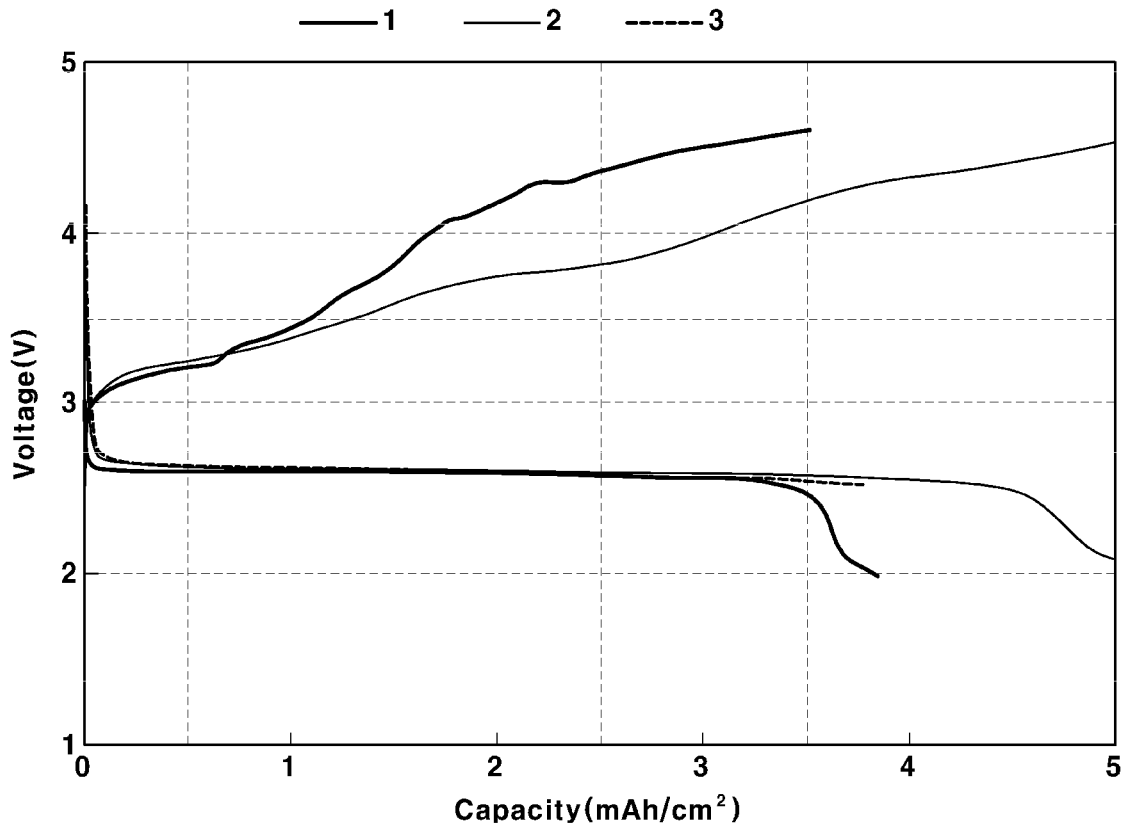
FIG. 12 is a charge and discharge graph of the folding type lithium air battery manufactured according to Comparative Example 2.

FIG. 8 is an ionic conductivity graph of folding type lithium air batteries manufactured according to Embodiments 1 and 2 and Comparative Examples 1 and 2.

FIGS. 9 to 12 are charge and discharge graphs of the folding type lithium air batteries manufactured according to Embodiments 1 and 2 and Comparative Examples 1 and 2.

As shown in FIGS. 8 to 12, as the content of the ionic liquid increases, the ionic conductivity and the battery's life are excellent. However, Comparative Example 2 showed the most excellent ionic conductivity, but the physical properties of the first and second electrolyte membrane were weak due to the high contents of the first and second ionic liquids, so that it was difficult to form an appearance. Furthermore, Comparative Example 1 showed the lowest ionic conductivity due to the low content of the ionic liquid, and showed very short battery life.

On the contrary, it was confirmed from embodiments 1 and 2 that the appearance of the electrolyte membrane was smooth and well formed while having the excellent ionic conductivity and battery life.

Experimental Example 2: Evaluation of Ionic Conductivity and Charge/Discharge Cycle Depending on Kind of First Ionic Liquid and Second Ionic Liquid In Embodiments 3 to 7 and Comparative Examples 3 to 7, after the manufactured folding type lithium air battery was charged and discharged, the ionic conductivity and the number of charge and discharge cycles were evaluated. The results are shown in FIGS. 13 and 14.

Figure 13:
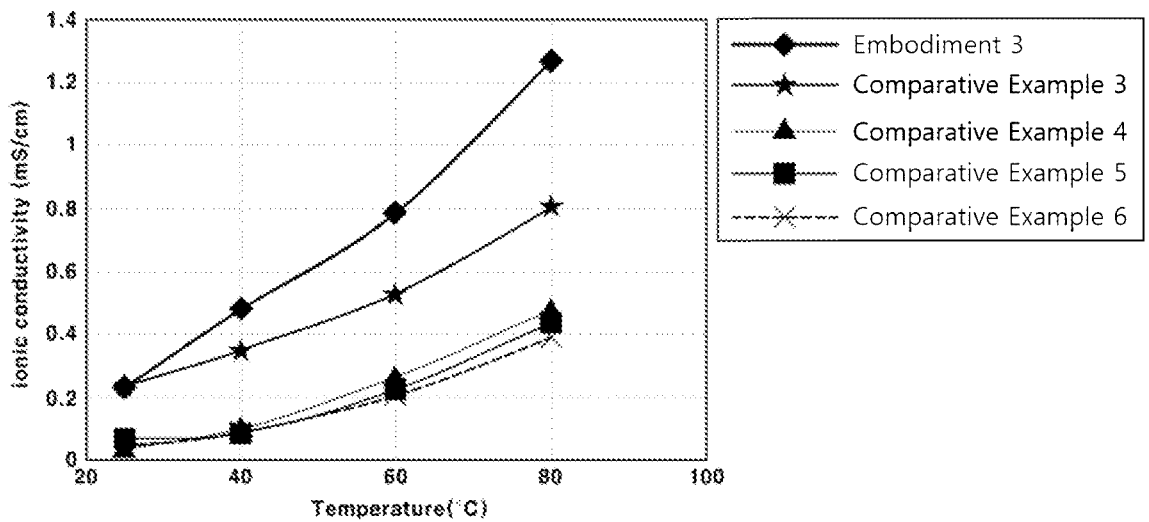
FIG. 13 is an ionic conductivity graph of folding type lithium air batteries manufactured according to Embodiment 3 of the present invention and Comparative Examples 3 to 6.

FIG. 13 is an ionic conductivity graph of folding type lithium air batteries manufactured according to Embodiment 3 and Comparative Examples 3 to 6. As shown in FIG. 13, it was confirmed that Embodiment 3 including $P_{13}$-TFSI as the second ionic liquid showed a remarkably excellent ionic conductivity as compared to Comparative Examples 3 to 6.

Figure 14:
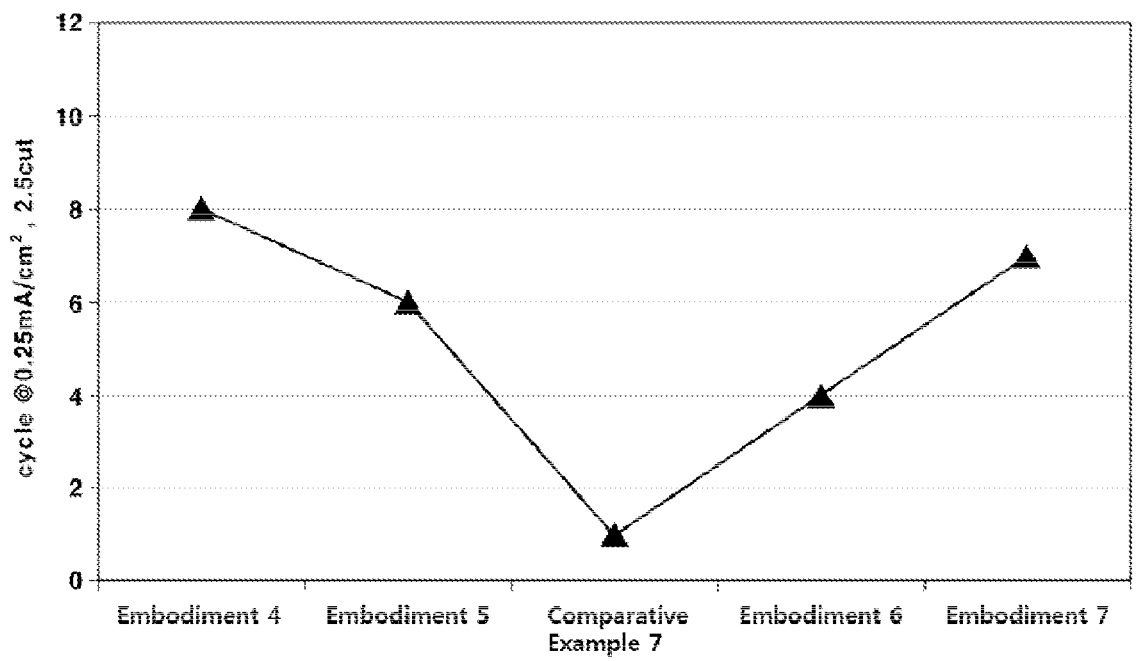
FIG. 14 is a graph showing a number of charge and discharge cycles of folding type lithium air batteries manufactured according to Embodiments 4 to 7 of the present invention and Comparative Example 7.

FIG. 14 is a graph showing a number of charge and discharge cycles of folding type lithium air batteries manufactured according to Embodiments 4 to 7 and Comparative Example 7. Referring to FIG. 14, in the case of Comparative Example 9 using $P_{13}$-TFSI as the first ionic liquid, the number of charge and discharge cycles is remarkably low.

Therefore, as the first ionic liquid and the second ionic liquid selectively use components that are suitable for the positive electrode composite and the negative electrode composite, respectively, the ionic conductivity and the battery's performance can be remarkably improved.

Although the present invention was described with reference to various exemplary embodiments shown in the drawings, it is apparent to those skilled in the art that the present invention may be changed and modified in various ways without departing from the scope of the present invention, which is described in the following claims. Therefore, it should be understood that the above-mentioned embodiment is merely illustrative but is not restrictive.

What is claimed is:

1. A folding type lithium air battery comprising:
    a positive electrode composite;
    a negative electrode composite; and
    a separator,
    wherein the separator is positioned between the positive electrode composite and the negative electrode composite, is bent to surround one edge of the positive electrode composite and an opposite edge of the negative electrode composite that is opposite to one edge of the positive electrode composite, thus forming a zigzag shape, and
    the separator comprises a first electrolyte membrane that is in contact with the positive electrode composite; a second electrolyte membrane that is in contact with the negative electrode composite; and a diffusion prevention membrane that is positioned between the first electrolyte membrane and the second electrolyte membrane, wherein the first electrolyte membrane comprises a first reinforcing layer and a first electrolyte solution impregnated in the first reinforcing layer, and the second electrolyte membrane comprises a second reinforcing layer and a second electrolyte solution impregnated in the second reinforcing layer, wherein the first electrolyte solution comprises a first ionic liquid, a first polymer, and a first lithium salt, wherein the second electrolyte solution comprises a second ionic liquid, a second polymer, and a second lithium salt, wherein the diffusion prevention membrane is selected from the group consisting of a sulfide-based solid electrolyte and an oxide-based solid electrolyte, wherein the positive electrode composite comprises a first positive electrode, a second positive electrode, and a porous structure positioned between the first positive electrode and the second positive electrode, the negative electrode composite comprises a first negative electrode, a second negative electrode, and a negative electrode current collector positioned between the first negative electrode and the second negative electrode, and wherein the folding type lithium air battery has an electrode length ratio satisfying the following Equation 1, Electrode length ratio: positive electrode($L2$)≤negative electrode($L4$)<separator($L3$)≤porous structure($L1$) [Equation 1]

(in Equation 1, the positive electrode (L2) is the first positive electrode or the second positive electrode, and the negative electrode (L4) is the first negative electrode or the second negative electrode).

2. The folding type lithium air battery of claim 1, wherein the first electrolyte membrane comprises the first reinforcing layer and the first electrolyte solution in a weight ratio of about 1:1 to 3, and the second electrolyte membrane comprises the second reinforcing layer and the second electrolyte solution in a weight of about 1:1 to 3.

3. The folding type lithium air battery of claim 1, wherein the first electrolyte solution comprises an amount of about 45 to 60 wt % of the first ionic liquid, an amount of about 25 to 30 wt % of the first polymer, and an amount of about 15 to 25 wt % of the first lithium salt, based on the total weight of the first electrolyte solution, and the second electrolyte solution comprises an amount of about 45 to 60 wt % of the second ionic liquid, an amount of about 25 to 30 wt % of the second polymer, and an amount of about 15 to 25 wt % of the second lithium salt, based on the total weight of the second electrolyte solution.

4. The folding type lithium air battery of claim 3, wherein the first polymer or the second polymercomprises one or more selected from the group consisting of polyvinylidene fluoride, polymethyl methacrylate, polyethylene oxide, polystyrene, poly(diallyldimethylammonium bis(trifluoromethanesulfonyl)imide (PDDA-TFSI), and poly(diallyldimethylammonium bis(fluorosulfonyl)imide (PDDA-FSI).

5. The folding type lithium air battery of claim 3, wherein the first lithium salt or the second lithium salt comprises one or more selected from the group consisting of LiTFSI, LiFSI, $LiNO_3$, and LiBr.

6. The folding type lithium air battery of claim 1, wherein the first electrolyte membrane further comprises an amount of about 0.1 to 10 parts by weight of one or more additives selected from the group consisting of CsI, LiI, and $LiNO_3$, based on 100 parts by weight of the first electrolyte solution, and the second electrolyte membrane further comprises an amount of about 0.1 to 10 parts by weight of one or more additives selected from the group consisting of CsI, LiI, and $LiNO_3$, based on 100 parts by weight of the second electrolyte solution.

7. The folding type lithium air battery of claim 1, wherein each of the first electrolyte membrane and the second electrolyte membrane has a thickness of about 5 to 200 μm.

8. The folding type lithium air battery of claim 1, wherein each of the first reinforcing layer and the second reinforcing layer has porosity of about 30 to 90% and a thickness of about 3 to 100 μm.

9. The folding type lithium air battery of claim 1, wherein each of the first reinforcing layer and the second reinforcing layer is selected from the group consisting of polyethylene, polyethylene terephthlate, polypropylene, polytetrafluoroethylene, polyvinylidene fluoride, polyimide, cellulose, and glass fiber.

10. The folding type lithium air battery of claim 1, wherein the positive electrode composite is configured such that the porous structure is stacked between the first positive electrode and the second positive electrode, or one surface and both edges of each of the first positive electrode and the second positive electrode are embedded in the porous structure, and the other surface of each of the first positive electrode and the second positive electrode forms the same layer as the porous structure.

11. The folding type lithium air battery of claim 3, wherein the first ionic liquid comprises one or more selected from the group consisting of 1-Ethyl-3-methylimidazolium bis(trifluoromethanesulfonyl)imide (EMIm-TFSI), 1-Ethyl-3-methylimidazolium bis(fluorosulfonyl)imide (EMIm-FSI), N-trimethyl-N-propylammonium bis(trifluoromethanesulfonyl)imide ($N_{1113}$-TFSI), N-trimethyl-N-propylammonium bis(fluorosulfonyl)imide ($N_{1113}$-FSI), N-Diethyl-N-methyl-N-(2-methoxyethyl)ammonium bis (trifluoromethanesulfonyl)imide (DEME-TFSI), N-Diethyl-N-methyl-N-(2-methoxyethyl)ammonium bis(fluorosulfonyl)imide (DEME-FSI), 1-butyl-1-methylpyrrolidinium bis (trifluoromethanesulfonyl)imide ($P_{14}$-TFSI), and 1-butyl-1-methylpyrrolidinium bis(fluorosulfonyl)imide ($P_{14}$-FSI).

12. The folding type lithium air battery of claim 3, wherein the second ionic liquid comprises one or more selected from the group consisting of N-methyl-N-propylpyrrolidinium bis(trifluoromethanesulfonyl)imide ($P_{13}$-TFSI), N-methyl-N-propylpyrrolidinium bis(fluorosulfonyl)imide ($P_{13}$-FSI), N-methyl-N-propylpiperidinium bis(trifluoromethanesulfonyl)imide ($PP_{13}$-TFSI), N-methyl-N-propylpiperidinium bis(fluorosulfonyl)imide ($PP_{13}$-FSI), 1-butyl-1-methylpiperidinium bis(trifluoromethanesulfonyl)imide ($PP_{14}$-TFSI), and 1-butyl-1-methylpiperidinium bis(fluorosulfonyl)imide ($PP_{14}$-FSI).

* * * * *